United States Patent
Oztaskin et al.

(10) Patent No.: US 7,702,826 B2
(45) Date of Patent: Apr. 20, 2010

(54) METHOD AND APPARATUS BY UTILIZING PLATFORM SUPPORT FOR DIRECT MEMORY ACCESS REMAPPING BY REMOTE DMA ("RDMA")-CAPABLE DEVICES

(75) Inventors: Ali S. Oztaskin, Beaverton, OR (US); Rajesh S. Madukkarumukumana, Portland, OR (US); Greg J. Regnier, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 11/321,272

(22) Filed: Dec. 28, 2005

(65) Prior Publication Data

US 2007/0162641 A1 Jul. 12, 2007

(51) Int. Cl.
*G06F 13/28* (2006.01)
(52) U.S. Cl. .................. 710/26; 710/22; 709/212
(58) Field of Classification Search .......... 710/22, 710/26; 709/212
See application file for complete search history.

(56) References Cited

U.S. PATENT DOCUMENTS

| | | | | |
|---|---|---|---|---|
| 5,586,253 A | * | 12/1996 | Green et al. | 714/53 |
| 6,658,521 B1 | * | 12/2003 | Biran et al. | 710/315 |
| 6,886,171 B2 | * | 4/2005 | MacLeod | 719/324 |
| 2002/0166038 A1 | * | 11/2002 | MacLeod | 711/202 |
| 2004/0049580 A1 | * | 3/2004 | Boyd et al. | 709/226 |
| 2004/0093389 A1 | * | 5/2004 | Mohamed et al. | 709/212 |
| 2006/0047771 A1 | * | 3/2006 | Blackmore et al. | 709/209 |
| 2006/0236063 A1 | * | 10/2006 | Hausauer et al. | 711/170 |
| 2007/0136554 A1 | * | 6/2007 | Biran et al. | 711/203 |

* cited by examiner

*Primary Examiner*—Eron J Sorrell
(74) *Attorney, Agent, or Firm*—Blakely, Sokoloff, Taylor & Zafman LLP (57) ABSTRACT

An apparatus and method related to performing Remote Direct Memory Access Request ("RDMA") is presented. In one embodiment, the apparatus comprises Remote direct memory access ("RDMA") logic that executes a direct memory access ("DMA") request from the remote peer. The apparatus further comprising a protection checking logic to verify a key and a target address in the DMA request and conversion logic to convert the target address to an input/output virtual address ("IOVA") if the conversion is required. The IOVA is to be translated to the host physical address by an address translation unit at another hardware subsystem.

24 Claims, 5 Drawing Sheets

METHOD AND APPARATUS BY UTILIZING PLATFORM SUPPORT FOR DIRECT MEMORY ACCESS REMAPPING BY REMOTE DMA ("RDMA")-CAPABLE DEVICES

CROSS-REFERENCE TO RELATED APPLICATIONS

This application is related U.S. patent application Ser. No. 10/822,564 filed Jun. 30, 2004 and entitled "Method, system, and program for utilizing a virtualized data structure table". The contents of this document are incorporated by reference herein.

FIELD OF THE INVENTION

The invention relates to address translation. More specifically, the invention relates to address translation in remote direct memory access ("RDMA") transactions.

BACKGROUND

Computer systems often define several address spaces to store various types or classes of data. For example, executable instructions may be stored in a code segment, while non-executable data may be stored in a data segment. Sometimes address spaces overlap, so that the same data may be referenced through two different addresses; other address spaces are entirely distinct, so that data located within one address space does not appear anywhere within the other space.

Separate (or separable) address spaces provide a powerful programming tool, and serve as a foundation for many advanced computing paradigms. Pre-emptive multitasking and virtual memory systems depend on hardware that permits the establishment of separate, protected memory spaces. Each process or thread in such a system can be provided with an execution environment that appears to contain memory and other resources dedicated solely to that process. An operating system ("OS") keeps track of the physical resources in the system (e.g. memory and devices) and arranges for the hardware to translate virtual addresses ("VA") used by the processes and threads into physical addresses ("PA") that the hardware can use.

Virtual machine systems add another level of abstraction to this model. In some virtual machine systems, low-level software called a "hypervisor" controls the system's physical resources and uses virtualization features of the processor(s) to create one or more virtual machines, each of which appears to be an independent computer with its own physical resources. A "guest" operating system can be started on each of these virtual machine. The guest OS manages the resources supplied by the hypervisor and doles them out to processes and/or threads running under the guest OS.

Several different address spaces are present in this three-level virtual machine model. At the lowest level, the hypervisor deals with physical addresses of real resources present in the host system—"Host Physical Addresses" ("HPA"). The guest OSs are presented with virtual resources that the hypervisor has arranged at locations within the address space of a virtual machine. Each guest OS uses "guest physical addresses" ("GPA") to refer to these resources. Finally, the guest OS prepares virtual execution environments for its threads and processes; the threads and processes use virtual addresses ("VA") to refer to resources the guest OS has allocated to them.

Modern central processing units ("CPUs") contain dedicated circuitry to translate between these addresses, so that a thread or process can quickly access data stored in a physical memory, when the thread has only a virtual address of the data. However, peripheral hardware units may not have ready access to these translation facilities, so it may be difficult or time-consuming for a non-CPU hardware device to access data stored in a physical memory when the software task controlling the device cannot provide a HPA. This situation may arise in the virtual machine environment described: a guest OS may only be able to provide GPAs to a peripheral, but the peripheral needs a HPA to transfer data to or from the intended memory location (such a transfer from device to memory is called a direct memory access, or "DMA.")

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention define an address space for use by devices that transfer data from physical memory on one system to physical memory on another system, or between two locations in physical memory on the same system. Data in the address space is referenced by input/output virtual addresses ("IOVAs"). On at least one of the systems, a hypervisor creates a virtual machine to support a guest OS and guest software, and the ultimate destination (or source) of the data transfer is within a guest software entity's virtual address space. A peripheral hardware device to perform the data transfer checks the target of the transfer, then reads or writes data at an IOVA. Translation logic in the system converts the IOVA to an appropriate HPA so that the correct data is read or written in physical memory.

Figure 1:
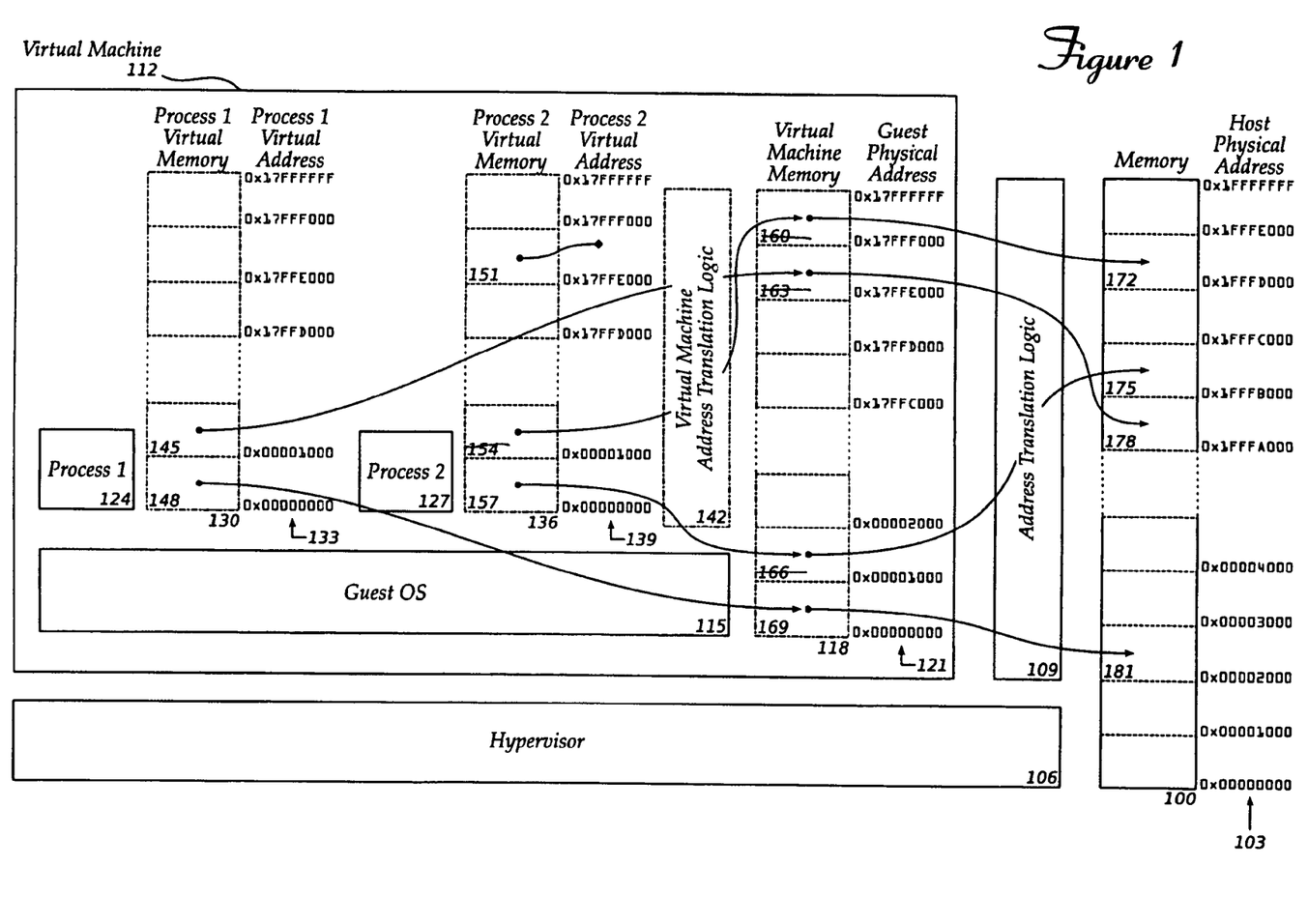
FIG. 1 shows relationships between several different address spaces in a virtual machine system.

FIG. 1 shows how several address spaces may be related within a computer system executing a hypervisor that provides one or more virtual machine environments. The system hardware provides a memory 100 to store data; the memory's contents may be addressed by placing host physical addresses ("HPAs") 103 on an address bus (not shown). Memory 100 is shown segmented into several "pages" 172, 175, 178, 181 of 4,096 ("4K") bytes each. The HPAs are shown running from 0x00000000 to 0x1fffffff, for a total available storage of 512 megabytes ("MB"). Embodiments of the invention may be used with systems containing more or less memory, and configured to operate on larger or smaller pages.

Hypervisor 106 may be a software program or an amalgamation of software, firmware, and hardware to control the system as described here. The system also includes address translation logic 109, which can be configured to map a first set of addresses linearly to a second set of addresses. Address translation is usually done in units of pages, so that all addresses within a page-sized block (4K in this example) map to addresses at corresponding offsets within a single page at the second address.

Hypervisor 106 configures and operates the physical system to behave substantially indistinguishably from one or more independent virtual machines 112. Software running on one of the virtual machines is isolated from software running on another, even though both virtual machines are actually sharing the same physical resources. In this figure, only one virtual machine 112 is depicted, but a hypervisor can frequently construct the appearance of several independent virtual machines using the resources available on a single physical machine.

Within virtual machine 112, hypervisor 106 provides a virtual machine memory 118, addressed by guest physical addresses ("GPAs") 121. The GPAs run from 0x00000000 to 0x17fffff for a total apparent storage in virtual machine 118 of 384 MB. Virtual-memory techniques that are known in the art may permit hypervisor 106 to provide more apparent storage to the virtual machines than actually exists in the system as physical memory 100.

Guest OS 115 executes within virtual machine 112, managing virtual machine memory 118 and other resources that hypervisor 106 may emulate (or permit guest OS 115 to use directly on the underlying physical system). In particular, guest OS 115 may use virtual machine address translation logic 142 to construct independent execution environments for processes running under its control (shown here as process 1, 124, and process 2, 127).

Each process may have a separate virtual address space containing pages of virtual memory (130, 136) addressed by virtual addresses (133, 139). In this figure, each process has a virtual address space that runs from 0x00000000 to 0x17fffff—that is, each process can address a memory space that is as large as the virtual machine memory 118 that guest OS 115 believes is available. Guest OS 115 may also use virtual-memory techniques to create the appearance of multiple execution environments whose combined size exceeds the amount of memory in virtual machine 112.

Processes 1 and 2 store data at locations in their virtual memories, but the data actually resides in pages of physical memory 100. Guest OS 115 may configure virtual machine address translation logic 142 so that process 1's first page (148, at virtual address 0x00000000) is stored in virtual machine memory page 169 (at guest physical address 0x00000000), but hypervisor 106 may have configured the real address translation logic 109 to store the data in physical memory at host physical address 0x00002000. Similar translation combinations may place process 1's second page 145 in physical page 178, or process 2's first page 157 at physical page 175. Other pages may be marked "not present," so that attempts to access the data they contain can be trapped and processed specially (e.g. page 151 at process 2's address 0x17ffe000).

FIG. 1 shows relationships between the address spaces known to various software entities. For example, processes 1 and 2 may only work with virtual addresses, while guest OS 115 is aware of translations between those virtual addresses and guest physical addresses 121. However, only hypervisor 106 may know of the final translation, from GPA 121 to HPA 103. In some embodiments, only one address translation may be performed. For example, hypervisor 106 may monitor guest OS 115's use of virtual machine address translation logic 142, and simply adjust real address translation logic 109 to perform translations that are consistent with guest OS 115's configuration, though the final translated addresses (HPAS) are not what guest OS 115 expects.

Figure 2:
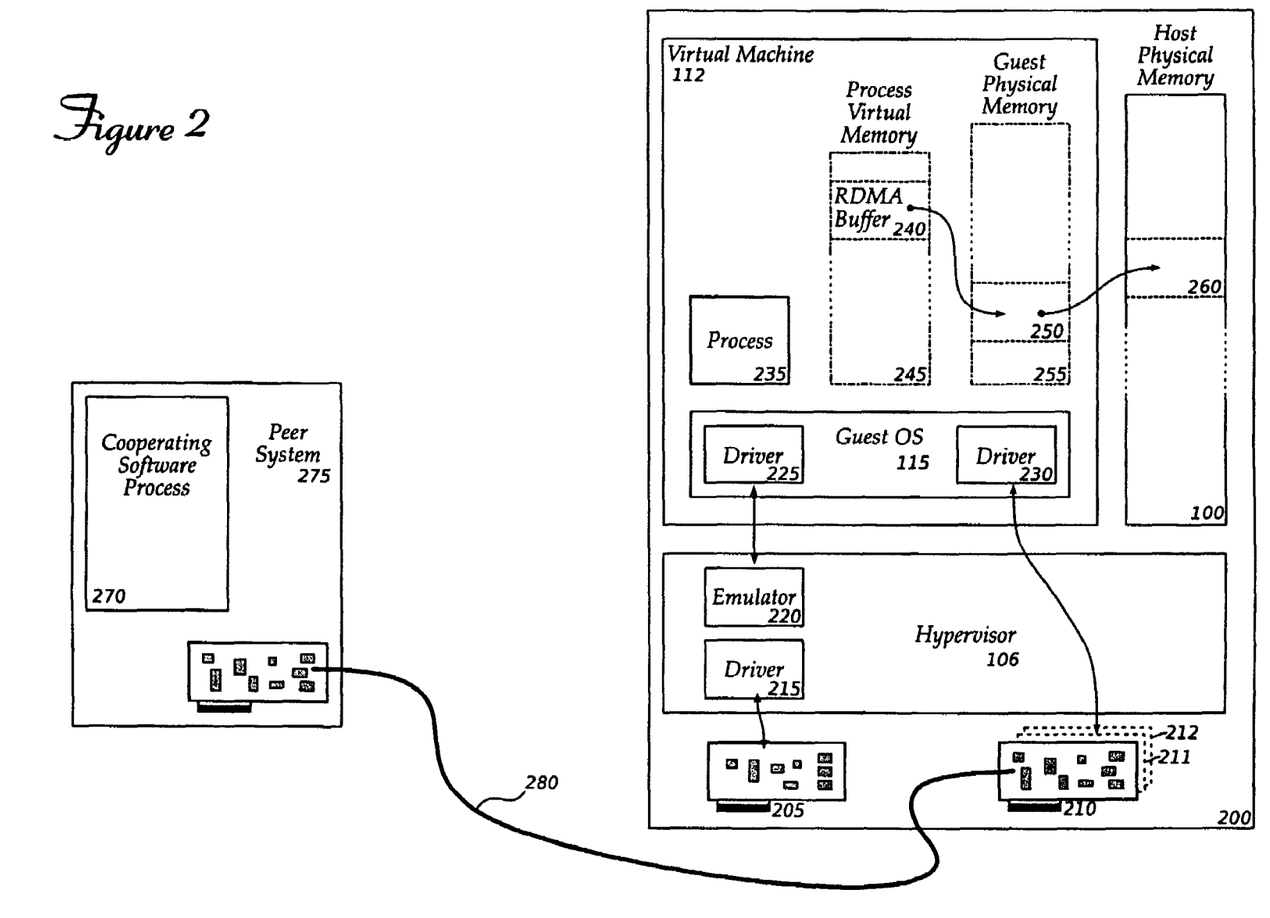
FIG. 2 shows a broader environment including a virtual machine system and a peer system, where the systems are to perform remote DMA ("RDMA") operations.

FIG. 2 shows a broader representation of an environment that can apply embodiments of the invention. Block 200 is a system that may be similar to the one discussed with reference to FIG. 1, and like-numbered elements may operate as previously described. System 200 also includes two network interface cards ("NICs") 205 and 210. NIC 205 may provide connectivity and data communication services for a single controlling software entity (shown here as driver 215 in hypervisor 106), while NIC 210 may be a virtualization-friendly unit that can interact with several controlling software entities and distinguish work done for each entity. NIC 210 can be viewed as providing a number of virtual network interfaces 211, 212 for its controllers, though it may have only a single set of signaling circuitry to transmit and receive data when communicating with remote peers. The hardware interactions (read and write cycles using the system's address and data buses, for example) of such a virtualization-friendly device may be identified by signals to indicate which virtual device is active.

Hypervisor 106 may emulate some hardware devices that it offers to its virtual machines (see, e.g., emulator 220 interacting with driver 225 in guest OS 115), but may permit other devices to be directly controlled by software in virtual machine 112 (for example, driver 230 in guest OS 115 interacts with one of the virtual interfaces provided by NIC 210).

In this figure, process 235, executing within virtual address space 245, is cooperating with another software process 270 executing on peer system 275. Cooperating process 270 may also be software running under a guest OS on another virtual machine—in fact, it could be running on another virtual machine constructed by hypervisor 106 on the very same physical system. These details are unimportant to the current description of embodiments of the invention.

Process 235 and cooperating process 270 have established a communication channel over a medium 280 such as an InfiniBand™ fabric or a network built on the internet protocol ("IP") or transmission control protocol ("TCP")—a TCP/IP network. The processes have arranged for the direct transfer of data from the address space of one to the address space of the other according to a protocol known generally as remote direct memory access, or "RDMA." The processes may set up source and destination buffers, then RDMA-capable hardware such as NIC 210 performs the transfer with little additional assistance or control from driver or application software. Once a configured transfer has been completed, the application may be notified with a signal, interrupt, or other indicator.

Figure 3:
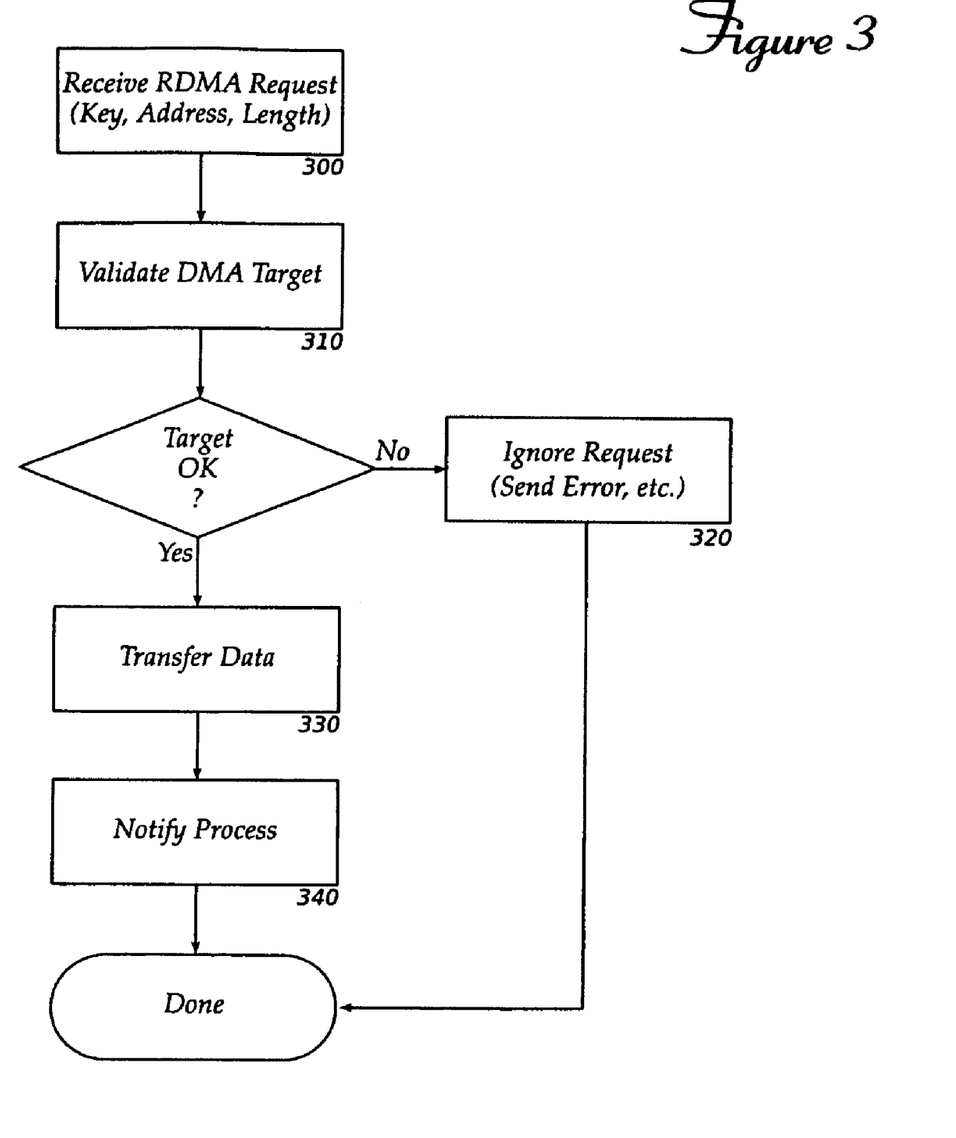
FIG. 3 is a flow chart of operations according to an embodiment of the invention.

FIG. 3 shows how an RDMA operation may occur in the environment depicted in FIG. 2. In the example considered here, process 235 has prepared an RDMA buffer 240 at an address within its virtual address space. The RDMA buffer may appear at location 250 within guest physical memory 255 and at memory location 260 within host physical memory 100, through various address translations from VA to GPA to HPA, as discussed previously. Process 235 may have provided an indicator or "key" to cooperating software 270 so that access to the RDMA buffer can be controlled. (Without such a key, malicious or malfunctioning software might cause process 235 to operate incorrectly by performing an unexpected RDMA and corrupting the contents of the RDMA buffer.) Cooperating software 270 is to prepare some data and place it in process 235's buffer using an RDMA transfer to an address provided by process 235. The events will be described from the perspective of hardware and software in system 200.

First, NIC 210 receives a request to begin an RDMA transaction (300). The request may include a DMA "target:" for example, a key, a destination or "target" address, and a desired transfer length. RDMA support logic in NIC 210 validates the DMA target to ensure that the sender of the request (presumably cooperating process 270) has appropriate access rights to transfer the proposed amount of data to the specified address (310). For example, the key may be looked up in a table that provides access permissions and buffer bounds. If the key validation fails, the RDMA request may be ignored or an error indication may be returned (320). If the validation is successful, RDMA execution logic in NIC 210 transfers data from the requester to the destination buffer (330). Transferring data may be accomplished by running "bus cycles:" placing the target address on an address bus, reading or writing data over a data bus, then advancing the target address. When the RDMA transaction is complete, NIC 210 may signal process 235 that new data is available in the RDMA buffer (340). An RDMA "read" operation may operate similarly, but after checking and validating the RDMA request, RDMA execution logic may copy data from the buffer and send it to the requester.

Recall that in the system configuration of FIG. 2, driver 230 within guest OS 115 interacts directly with NIC 210 (or with one of its virtual service points 211, 212). However, from the discussion of FIG. 1, it is clear that none of the software executing within virtual machine 112 has knowledge of the host physical addresses needed to reference locations in host physical memory 100. Thus, the address provided to NIC 210 will require translation so that the correct physical memory locations can be accessed.

In prior-art systems, NIC 210 was provided with internal translation logic, separate from the address translation logic associated with the processor(s) in the main system. This translation logic would be configured by the hypervisor or other software with knowledge of the relationship between VA, GPA and HPA. However, recent developments in virtual machine systems, such as those described in pending application Ser. No. 10/882,564, permit an alternate operational model. In this new model, a hardware device such as an RDMA-capable NIC can place an address on the system's address bus (along with other information as described below) and exchange data with physical memory over a data bus. The system detects the RDMA device's bus cycles and translates the address to an appropriate HPA, so that the RDMA device reads or writes the intended memory location.

Moving the address translation duties from the NIC may permit the NIC to be simpler, faster, and less expensive. An RDMA NIC may still perform DMA target validation, since that operation may be specific to an RDMA protocol. However, relying on the system's general address translation capabilities may reduce overhead related to multiple address translations and simplify translation table maintenance.

Figure 4:
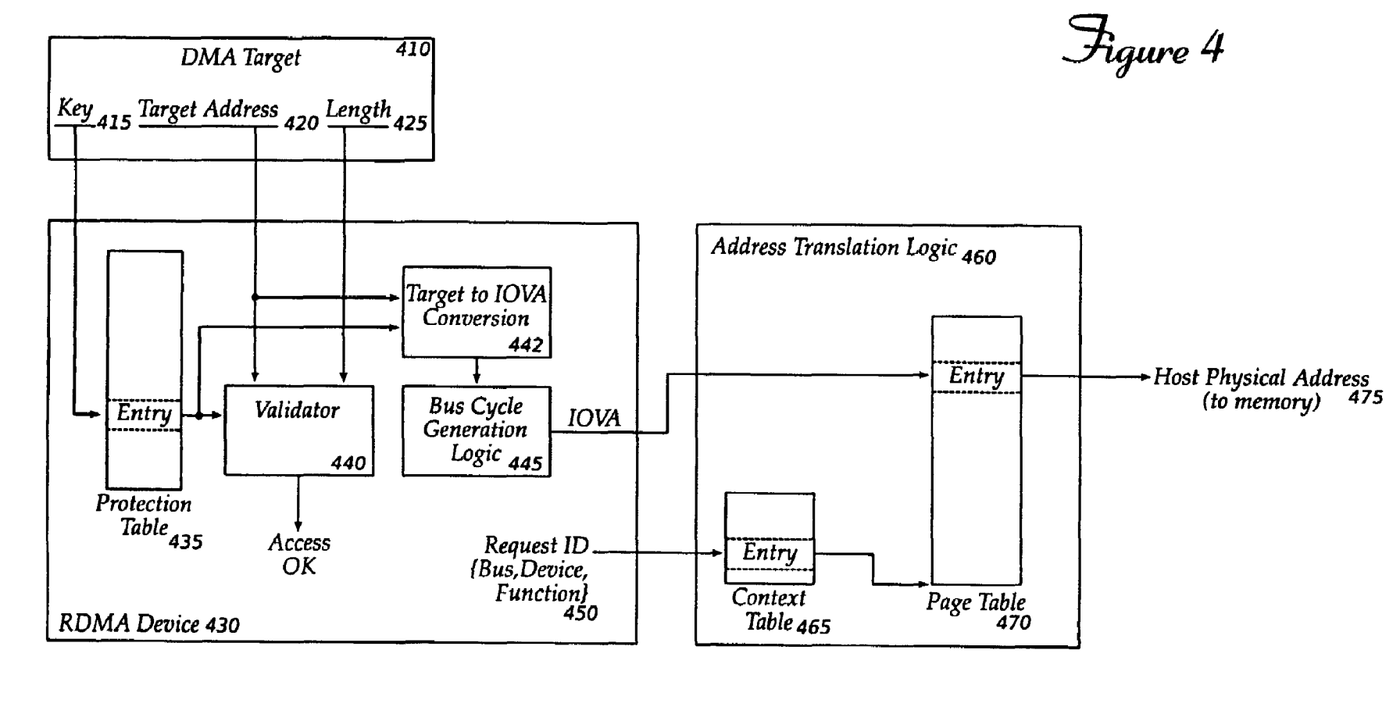
FIG. 4 shows a division of functions between components in an embodiment of the invention.

FIG. 4 shows how validation and data transfer (including address translation) operations shown in FIG. 3 may be divided between an RDMA device and the system's general address translation logic. Element 410 is a DMA target that might be received from a peer system. The target includes a key 415, target address 420, and length 425. The target address may have been provided by a software process that had prepared an RMDA buffer or by driver software that translated the virtual address of the RDMA buffer to a guest physical address. Alternatively, it may be an address within a completely separate address space, such as an address space dedicated to transactions from input/output devices (an I/O virtual address, or "IOVA").

Protection checking logic within an RDMA device 430 may look up key 415 in a protection table 435, and validator 440 may use the corresponding entry to determine whether the proposed RDMA operation to/from the DMA target should be allowed. Then, target address 420 is passed to target-to-input/output virtual address ("IOVA") conversion logic 442 to be converted to an IOVA. This conversion provides an extra layer of indirection that may be useful in some situations; if the indirection is not useful, a "null" conversion may simply pass the target address through unchanged. Bus cycle generation logic 445 uses the IOVA to perform bus cycles to read or write data at addresses starting from the IOVA. These input/output virtual addresses are passed to address translation logic 460, which produces a corresponding host physical address 475. The RDMA device may also provide additional information 450 to address translation logic 460 to control the translation. For example, a virtualization-friendly RDMA device may provide a request ID 450 (possibly including information such as a bus identifier, a device identifier or a function identifier) to identify a virtual instance or "service point" of the device. Address translation logic can look up the request ID in a context table 465 to identify a virtual machine executing the software that prepared the RDMA buffer and select a page table 470 appropriate for that virtual machine. (A "page table" is the common name for the data structure that controls address translations.). With the division of functions shown in FIG. 4, only one address translation (from DMA target address—a VA, GPA, or IOVA—to HPA) is made. Furthermore, the translation is made by a different hardware subsystem containing logic to remap DMA addresses, instead of by RDMA device 430 (which, in this embodiment, performs only the DMA target validation and bus cycles to the target address or a related I/O virtual address). Note that the conversion from target address to IOVA by conversion logic 442 is significantly different from the address translation by logic 460. The former typically operates on a per-target or per-RDMA-buffer basis, so only a small amount of state information is required, and the conversion is only of concern to the RDMA hardware and its controlling software. IOVA-to-HPA translation, on the other hand, operates on a page-by-page basis, so it may require a larger amount of state information, which is typically stored in page tables in physical memory. Furthermore, the mapping from IOVA to HPA is closely connected with the larger virtual-to-physical memory mapping system, and mapping changes may affect the hypervisor and guest software generally. Reducing the number of virtual-to-host-physical translations can provide real performance benefits, while eliminating the target-to-IOVA conversion may simply reduce system flexibility.

Figure 5:
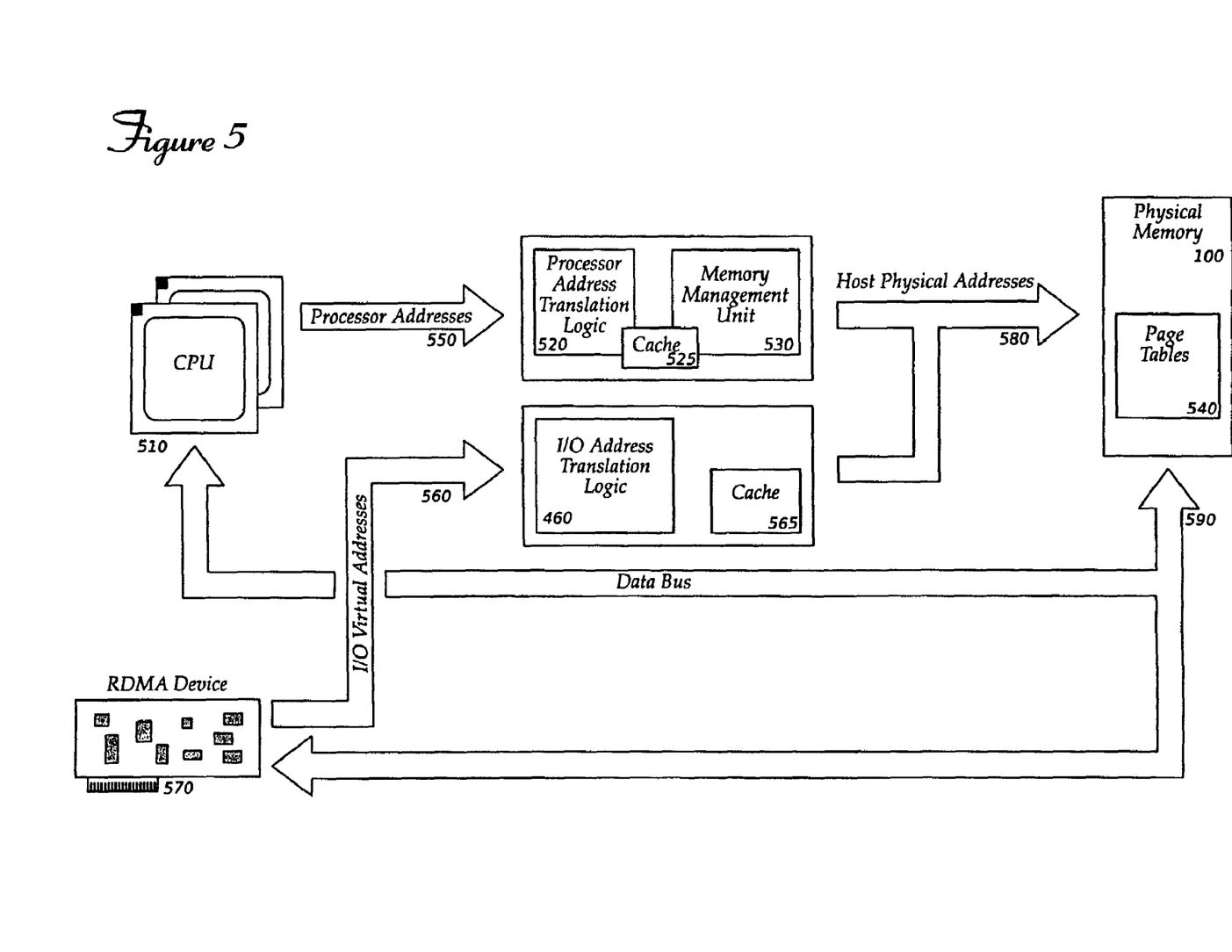
FIG. 5 is a block diagram showing some components of an RDMA-capable system.

FIG. 5 shows a block diagram of some of the hardware components that may be present in a system that implements an embodiment of the invention. One or more central processing units ("CPUs") 510 may be configured to execute instructions and manipulate data stored in physical memory 100. Some CPUs may contain two or more independent instruction execution cores but share some common support circuitry. Systems with an assortment of single-core and multi-core processors are possible. Processor address translation logic 520 and memory management unit ("MMU") 530 may be integrated into the processor(s) or provided as separate modules. These modules perform various functions related to processor address translation and memory access, as described in the foregoing material. A cache 525 may be provided to improve the performance of the processor address translation logic. I/O address translation logic 460 may be similar to that described with reference to FIG. 4. This logic may also be integrated with the processors and/or other address translation logic, or implemented in a separate chipset. I/O address translation logic 460 translates I/O virtual addresses 560 from peripheral devices into host physical addresses 580. Translations and access control may be done under the control of data stored in page tables or similar data structures 540 in physical memory 100. Processor address bus 550 carries addresses from processors 510 to the address translation and MMU modules, while I/O address bus 560 carries I/O virtual addresses from peripheral devices such as RDMA device 570. Translated addresses (host physical addresses) from the address translation modules are sent to physical memory 100 over memory address bus 580. Physical memory 100 may respond only to host physical addresses. Data bus 590 carries data to and from physical memory 100.

I/O Address translation units 460 may include a cache 565 to store information about recently used address translations. For example, a first bus cycle to access memory at an IOVA may require the I/O address translation unit 460 to retrieve information from page tables 540, but subsequent accesses may proceed more quickly because the IOVA-to-HPA translation has been cached. RDMA device 570 may use this functionality to improve performance by, for example, running bus cycles to IOVAs that are expected to be accessed soon. These bus cycles can "warm" the cache by causing the translation unit to load necessary translation information. An RDMA device may also contain cache invalidation logic to signal the I/O address translation 460 logic or cache 565 to invalidate a cache entry that is no longer useful.

The applications of the present invention have been described largely by reference to specific examples and in terms of particular allocations of functionality to certain hardware and/or software components. However, those of skill in the art will recognize that RDMA address remapping can also be performed by software and hardware that distribute the functions of embodiments of this invention differently than herein described. Such variations and implementations are understood to be captured according to the following claims.

We claim:

1. A method comprising:
   receiving a direct memory access ("DMA") target including a target address located within an input/output virtual address ("IOVA") space;
   validating the DMA target in a first hardware subsystem using protection checking logic to check the target address and a key generated on a remote hardware system, the remote key having been transmitted to a remote peer;
   sending an IOVA translation request to the remote hardware system in response to receiving the DMA target from the remote peer, wherein the remote hardware system and the remote peer are different; and
   transferring data between the DMA target identified by the IOVA and a second location after the IOVA is translated to a corresponding host physical address ("HPA") by the remote hardware system separate from the first hardware subsystem.

2. The method of claim 1 wherein the sending the IOVA translation request comprises placing the IOVA on an address bus, wherein the transferring comprises exchanging the data over a data bus.

3. The method of claim 1, further comprising:
   warming a translation cache before transferring the data.

4. The method of claim 1, further comprising:
   performing exactly one translation between the IOVA and the corresponding host physical address.

5. The method of claim 4 wherein the validating operation is to be performed by a first hardware subsystem; and the exactly one translation is to be performed by the remote hardware system.

6. The method of claim 5 wherein the first hardware subsystem is a remote DMA ("RDMA") device and the remote hardware system is DMA address remapping logic.

7. The method of claim 1, wherein the protection checking logic is part of a local device, wherein the remote peer, the remote hardware system, and the local device are different.

8. The method of claim 1, wherein the IOVA translation request to the remote hardware system includes an identification to a virtual machine that creates RDMA buffer in response to a program executing on the remote peer.

9. The method of claim 1, wherein the IOVA translation request is sent without a key to verify the remote peer.

10. An apparatus comprising:
    signaling circuitry to communicate with a remote peer;
    remote direct memory access ("RDMA") logic to execute a direct memory access ("DMA") request from the remote peer;
    protection checking logic in a first hardware subsystem to check a key and a target address from the remote peer, the key being generated on a remote hardware system and having been transmitted to the remote peer;
    conversion logic to convert the target address to an input/output virtual address ("IOVA"); and
    bus cycle generation logic to send an IOVA translation request to the remote hardware system in response to receiving the DMA request from the remote peer, the bus cycle generation logic is operable to place the IOVA on an I/O address bus and to read a corresponding data from a memory after the IOVA is translated to a corresponding host physical address ("HPA") on a memory address bus by the remote hardware system separate from the first hardware subsystem, wherein the remote hardware system and the remote peer are different.

11. The apparatus of claim 10 wherein the bus cycle generation logic places additional information on the I/O address bus, the additional information including at least one of:
    a bus identifier;
    a device identifier; and
    a function identifier.

12. The apparatus of claim 10, further comprising:
    a translation cache;
    translation-caching logic to obtain an IOVA-to-physical address translation from the remote hardware system; and
    translation-cache invalidation logic to invalidate an entry in said translation cache if a signal is received from the remote hardware system.

13. The apparatus of claim 10, further comprising:
    logic to emulate a plurality of independent functional units, wherein an independent functional unit is to be allocated to a guest operating system.

14. The apparatus of claim 13 wherein the IOVA of a first emulated functional unit refers to a first memory location in the memory, and the IOVA of a second emulated functional unit refers to a second, different memory location in the memory.

15. The apparatus of claim 10, wherein the protection checking logic is part of a local device, wherein the remote peer, the remote hardware system, and the local device are different.

16. The apparatus of claim 10, wherein the IOVA translation request to the remote hardware system includes an identification to a virtual machine that creates RDMA buffer in response to a program executing on the remote peer.

17. The apparatus of claim 10, wherein the IOVA translation request is sent without a key to verify the remote peer.

18. The apparatus of claim 10, wherein the IOVA translation request is sent before the protection checking logic checks the key and the target address.

19. The apparatus of claim 10, wherein the protection checking logic is a part of a local device, wherein the local device is operable to perform an RDMA request without storing an address translation table.

20. The apparatus of claim 10, wherein the target address, the IOVA, and the HPA are different.

21. A system comprising:
a plurality of processors;
a communication interface;
protection checking logic in a first hardware subsystem to validate a key and an input/output virtual address ("IOVA") of a remote direct memory access ("RDMA") request, the key being generated on a remote hardware system and having been transmitted to the remote peer;
bus control logic to send an IOVA translation request to a remote hardware system in response to receiving the RDMA request from the remote peer, the bus cycle generation logic is operable to place the IOVA on an I/O address bus and to read a corresponding data from a memory after the IOVA is translated to a corresponding host physical address ("HPA") on a memory address bus by the remote hardware system separate from the first hardware subsystem, wherein the remote hardware system and the remote peer are different;
the memory responsive to the host physical address on the memory address bus; and
an address translation unit to translate the IOVA from the communication interface to the HPA.

22. The system of claim 21, further comprising:
a memory management unit to manage data traffic between the plurality of processors and the memory; and
a data structure to control the address translation unit and the memory management unit.

23. The system of claim 21, further comprising:
remote direct memory access ("RDMA") logic to receive the RDMA request through the communication interface.

24. The system of claim 21, further comprising:
a hypervisor to manage a plurality of guest operating systems; and
a guest operating system having a device driver to control the communication interface; wherein the device driver is to provide the IOVA to the communication interface; and the communication interface is to transfer data from a memory at a location identified by the IOVA.

* * * * *